United States Patent
Hirasawa

(10) Patent No.: US 9,609,229 B2
(45) Date of Patent: Mar. 28, 2017

(54) LIGHT EMITTING APPARATUS, IMAGE PICKUP APPARATUS AND CONTROL METHOD THEREFOR

(71) Applicant: CANON KABUSHIKI KAISHA, Tokyo (JP)

(72) Inventor: Ginta Hirasawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 66 days.

(21) Appl. No.: 14/680,288

(22) Filed: Apr. 7, 2015

(65) Prior Publication Data
US 2015/0296115 A1 Oct. 15, 2015

(30) Foreign Application Priority Data
Apr. 14, 2014 (JP) .................. 2014-082894

(51) Int. Cl.
*H04N 5/235* (2006.01)
*H05B 33/00* (2006.01)
*H05B 33/08* (2006.01)

(52) U.S. Cl.
CPC ....... *H04N 5/2354* (2013.01); *H05B 33/0869* (2013.01)

(58) Field of Classification Search
None
See application file for complete search history.

(56) References Cited

U.S. PATENT DOCUMENTS

| 5,021,875 | A  | * | 6/1991 | Iida ....................... H04N 9/735 348/227.1 |
| 2004/0263678 | A1 | * | 12/2004 | Kawakami ........... H04N 5/2354 348/371 |
| 2010/0134020 | A1 | * | 6/2010 | Peng ................... H05B 33/0872 315/133 |
| 2011/0187920 | A1 | * | 8/2011 | Shimada ................ H04N 5/222 348/371 |
| 2012/0177352 | A1 | * | 7/2012 | Pillman ................ H04N 5/2354 396/61 |
| 2015/0116561 | A1 | * | 4/2015 | Takei ...................... A61B 1/00 348/296 |
| 2015/0296115 | A1 | * | 10/2015 | Hirasawa ........... H05B 33/0869 348/370 |
| 2016/0191881 | A1 | * | 6/2016 | Sako ..................... H04N 9/735 348/224.1 |

FOREIGN PATENT DOCUMENTS

JP 2008-011557 A 1/2008

* cited by examiner

*Primary Examiner* — W B Perkey
(74) *Attorney, Agent, or Firm* — Fitzpatrick, Cella, Harper & Scinto

(57) ABSTRACT

A light emitting apparatus that can obtain accurate color information including change of color information during luminescence. An information obtaining unit obtains status information on a status change of a light source in a luminescence time period of the light source. A determination unit determines color information of a light emitted from the light source in the luminescence time period based on the status information obtained by the information obtaining unit.

16 Claims, 6 Drawing Sheets

LIGHT EMITTING APPARATUS, IMAGE PICKUP APPARATUS AND CONTROL METHOD THEREFOR

BACKGROUND OF THE INVENTION

Field of the Invention

The present invention relates to a light emitting apparatus, an image pickup apparatus and a control method therefor, and more particularly, to control of the light emitting apparatus.

Description of the Related Art

Generally, there is a case where image pickup is performed by an image pickup apparatus such as a digital camera using a light emitting apparatus (also referred to as a flash unit) such as a stroboscopic device (hereinafter, simply referred to as a strobe). In such a case, color balance in image data obtained as a result of image pickup is corrected using luminescent color information (hereinafter, simply referred to as color information) indicating luminescent color of strobe light (see Japanese Laid-Open Patent Publication (Kokai) No. 2008-11557).

While, conventionally, a Xe tube is typically used as a light source of a strobe, in recent years, an LED is more likely to be used as a light source of a strobe in accordance with development of the LED. However, while, in the case of the Xe tube, there is no substantial change in luminescent color during luminescence, in the LED, a temperature of the device increases due to heating caused by luminescence of the LED itself, which may change color information indicating the luminescent color of the strobe light.

FIG. 8 is a diagram for explaining change of color information in the conventional strobe using an LED.

FIG. 8 shows time in a horizontal axis and a device temperature of an LED in a vertical axis. It is assumed here that luminescence of a strobe starts upon start of exposure when image pickup is performed, and the luminescence of the strobe is stopped upon end of the exposure. At this time, the device temperature of the LED changes as indicated by a curve 201 from start of the exposure until the end of the exposure, and the device temperature becomes the highest at the end of the exposure. A region indicated by diagonal lines in FIG. 8 is a region where the device temperature is lower than the device temperature at the end of the exposure.

As shown in FIG. 8, if the device temperature of the LED changes, when it is tried to detect the device temperature after the luminescence is finished to obtain color information, the color information does not include color information at the start of luminescence and during the luminescence, and, thus, there may be an error in the color information.

As a result of correcting color balance of image data according to the color information at the end of luminescence which does not include change of the color information during the luminescence, it is impossible to correct the color balance of the image data with high accuracy.

Further, in the camera disclosed in the above-described Japanese Laid-Open Patent Publication (Kokai) No. 2008-11557, because color information of a light emitting section is obtained by acquiring light reflected at an object using a color sensor, the color information is susceptible to the influence of the object, and, thus, it is also difficult to correct the color balance of the image data with high accuracy.

SUMMARY OF THE INVENTION

The present invention provides a light emitting apparatus capable of obtaining accurate color information including change of color information during luminescence, an image pickup apparatus, and a control method therefor.

Accordingly, the present invention provides a light emitting apparatus, comprising a light source, an information obtaining unit configured to obtain status information on a status change of the light source in a luminescence time period of the light source, and a determination unit configured to determine color information on a light emitted from the light source in the luminescence time period based on the status information obtained by the information obtaining unit.

Further features of the present invention will become apparent from the following description of exemplary embodiments (with reference to the attached drawings).

DESCRIPTION OF THE EMBODIMENTS

An example of a light emitting apparatus according to embodiments of the present invention will be described below with reference to the drawings.

Figure 1:
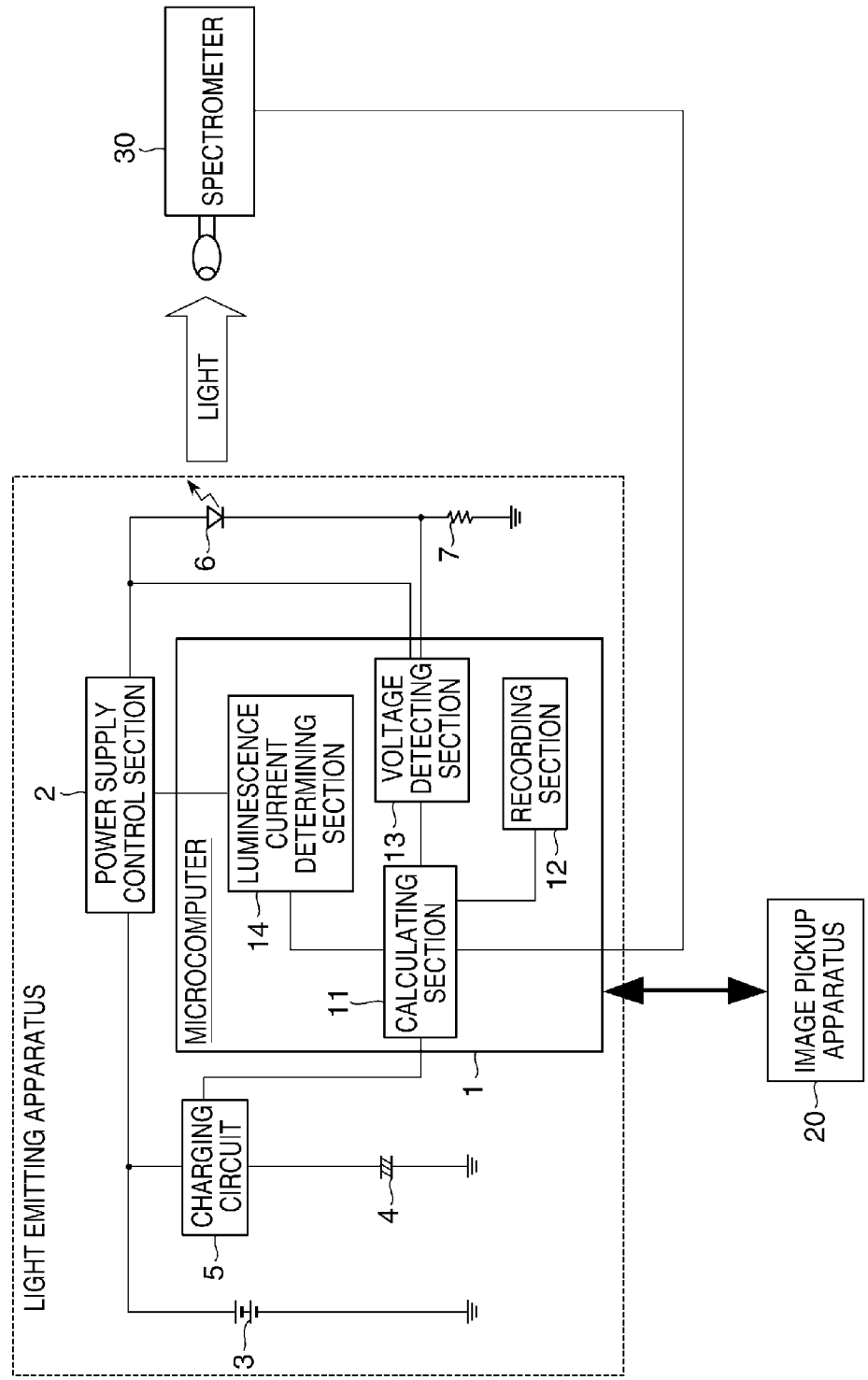
FIG. 1 is a block diagram showing an exemplary configuration of a light emitting apparatus according to a first embodiment of the present invention and an image pickup apparatus.

FIG. 1 is a block diagram showing an exemplary configuration of a light emitting apparatus according to a first embodiment of the present invention and an image pickup apparatus.

When an object is shot, the light emitting apparatus shown in FIG. 1 (hereinafter, referred to as a strobe) drives and controls an LED (light emitting section) 6 which is a light source, to illuminate the object. The strobe includes a microcomputer 1, which, as will be described later, turns on and off a power supply control section 2 which is an LED drive circuit, detects a forward voltage (Vf) of the LED 6 which is a light source, and calculates color information indicating luminescent color of an LED light. Further, the microcomputer 1 determines LED drive conditions, or the like, to control luminescence of the strobe. It should be noted that a light source is not limited to an LEC, and the present invention may be applied to a light emitting apparatus which is provided with a light source other than an LED as far as color information on the light source changes in a luminescence time period.

An image pickup apparatus (hereinafter, referred to as a camera) 20 such as a digital camera is connected to the microcomputer 1, and a strobe luminescence instruction is transmitted from the camera 20 to the microcomputer 1. Further, the color information of the LED is transmitted from the microcomputer 1 to the camera 20, and the camera 20 performs color balance processing for correcting color balance of image data according to the color information.

The strobe has a power supply 3 such as a battery, and a charging circuit 5 charges a charging section (for example, a capacitor) 4 using the power supply 3 under control of the microcomputer 1. Here, for example, an electric double-layer capacitor is used as the capacitor 4.

The power supply control section 2 which is, for example, a voltage step down switching converter circuit, drives the LED 6 connected to an output side using the capacitor 4 as a power supply (that is, an input side) with a predetermined current under control of the microcomputer 1.

Further, a voltage detection resistor 7 is connected in series to the LED 6. A spectrometer 30 which is disposed to face the LED 6, measures color information relating to luminescence of the LED 6 in advance and transmits the color information to the microcomputer 1 as will be described later.

As shown in FIG. 1, the microcomputer 1 has a calculating section 11, a recording section 12, a voltage detecting section 13 and a luminescence current determining section 14. The microcomputer 1 periodically detects a forward voltage Vf of the LED 6 and obtains color information of the LED light which changes during luminescence according to the forward voltage Vf of the LED. The microcomputer 1 integrates the color information obtained for each forward voltage Vf to obtain accurate color information (hereinafter, referred to as final color information) including color information which changes during luminescence.

It should be noted that while, here, a device temperature of the LED 6 is obtained according to the forward voltage Vf using a method which will be described later, a method for detecting the device temperature of the LED is not limited to this. The device temperature of the LED may be detected as temperature information on a light source which is status information on a status change of the light source using a temperature sensor.

Figure 2:
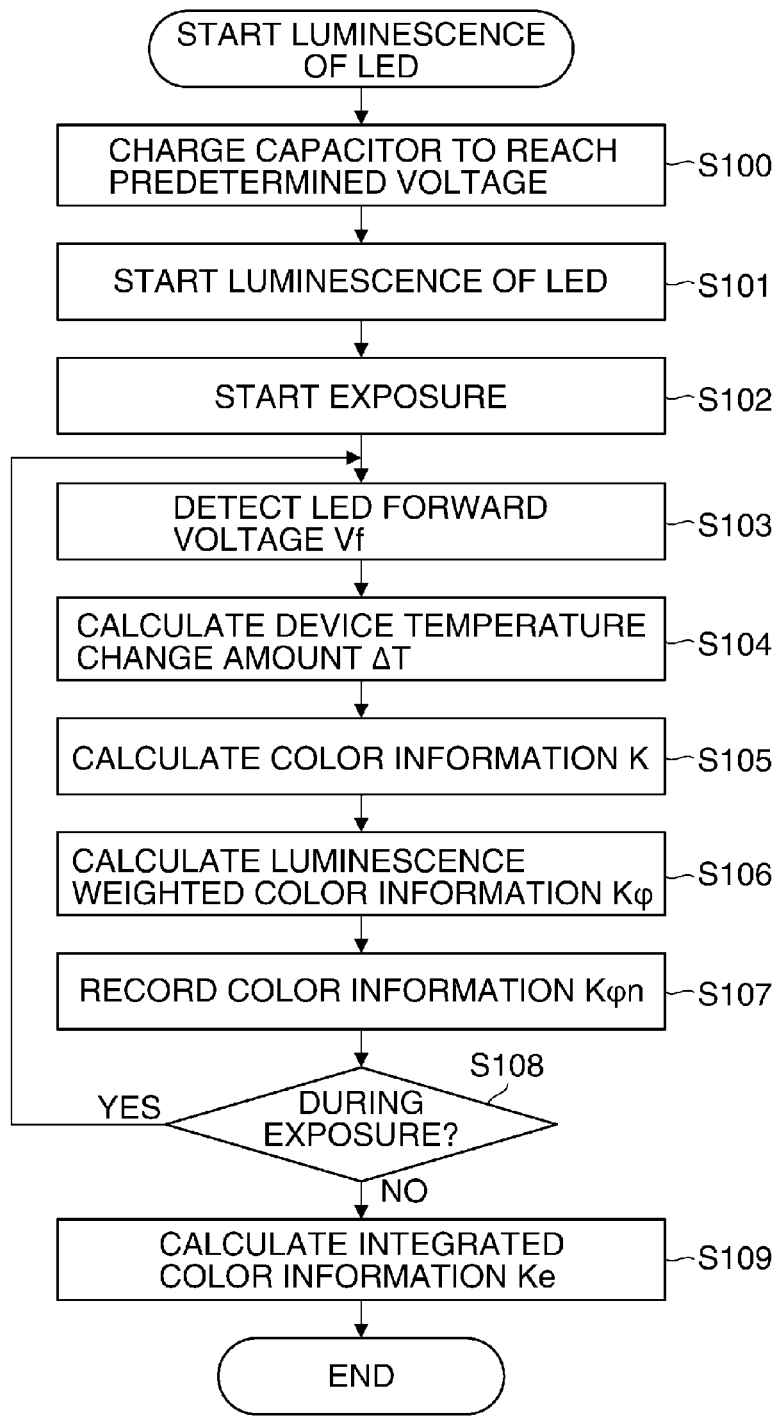
FIG. 2 is a flowchart for explaining processing of detecting color information of an LED in a strobe shown in FIG. 1.

FIG. 2 is a flowchart for explaining processing of detecting color information of the LED 6 in a strobe shown in FIG. 1. It should be noted that the processing according to the shown flowchart is performed under control of the microcomputer 1.

When LED luminescence processing is started, the calculating section 11 controls the charging circuit 5 to start charging of the capacitor 4 using the power supply 3 and charges the capacitor 4 to reach a predetermined voltage (step S100). Then, when a luminescence instruction is received from the camera 20, the luminescence current determining section 14 determines a current value (luminescence current) to be flowed to the LED 6 and makes the LED 6 emit light by controlling the power supply control section 2 to step down the voltage of the capacitor 4 (step S101: start of LED luminescence).

When the LED 6 emits light, the camera 20 starts exposure (step S102). At the same time as the start of the exposure by the camera 20, the voltage detecting section 13 detects a forward voltage Vf of the LED 6 using the voltage detection resistor 7 (step S103).

The processing in step S103 is periodically performed at predetermined time intervals until the luminescence is finished. Therefore, a plurality of forward voltages Vf are detected from start of the luminescence of the LED 6 until end of the luminescence.

Subsequently, the calculating section 11 calculates a change amount $\Delta T$ of the device temperature of the LED 6 using the detected forward voltage Vf (step S104). Because the forward voltage Vf of the LED individually varies depending on devices, it is necessary to store forward voltages Vf under predefined conditions to obtain the device temperature from the change amount of the forward voltage Vf.

Here, the forward voltages recorded under predetermined conditions are referred to as a reference forward voltage Vfs, and a conversion coefficient for converting a change amount of the forward voltage Vf from the reference forward voltage Vfs into a change amount $\Delta T$ of the device temperature of the LED 6 is set as a. The conversion coefficient $\alpha$ is set at a fixed value because it is determined according to physical property of the white LED and, thus, there is small individual variation in the conversion coefficient $\alpha$.

For example, the calculating section 11 calculates the change amount $\Delta T$ of the device temperature of the LED 6 using the following equation (1).

[Expression 1]

$$\Delta T=(Vfs-Vf)\times\alpha \quad (1)$$

Subsequently, the calculating section 11 calculates color information K of the LED light according to the change amount $\Delta T$ of the device temperature (step S105). Because the color information of the LED light individually varies widely, it is necessary to record color information which is used as a reference (referred to as reference color information) under the conditions such as a predefined ambient temperature, a current value and illumination time.

Here, the reference color information recorded in advance is set as Ks, and a conversion coefficient for converting the change amount $\Delta T$ of the device temperature into the change amount of the color information is set as $\beta$.

Figure 3:
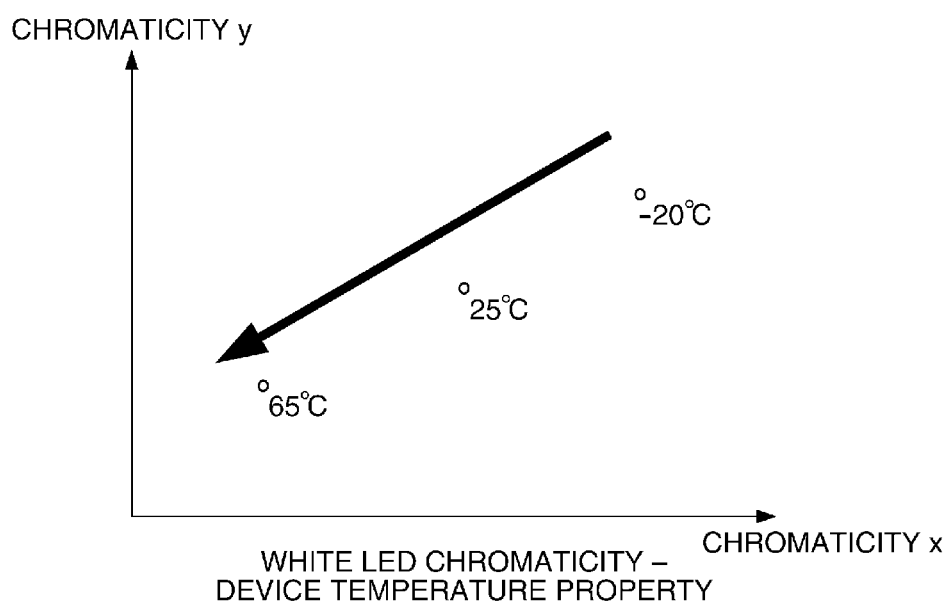
FIG. 3 is a diagram showing relationship between a device temperature and change of chromaticity of a typical white LED.

FIG. 3 is a diagram showing relationship between the device temperature and change of chromaticity of a typical white LED.

FIG. 3 shows chromaticity at each of a horizontal axis and a vertical axis, and, when white is obtained by combining a blue LED and a yellow phosphor which are typical components of the white LED, if the temperature of the white LED becomes high, the luminescent color shifts in a direction of blue (a temperature change property of color information). That is, because change of the color information in the white LED has regularity, it is possible to obtain the conversion coefficient $\beta$ according to the regularity.

For example, the calculating section 11 calculates the color information K using the following equation (2).

[Expression 2]

$$K=Ks+\Delta T\times\beta \quad (2)$$

When the device temperature of the LED becomes high, luminous efficiency of the LED is degraded because of its physical property (a temperature change property of an amount of luminescence). When the color information is integrated, the calculating section 11 performs weighting on the color information K taking into account the amount of luminescence of the LED light at the time when the color information is obtained (step S106).

While tristimulus values (X, Y, Z) are used for the color information K here, the color information is not limited to the tristimulus values. Given that a luminous efficiency coefficient which changes according to the device temperature of the LED is η, it is possible to perform weighting on the color information taking into account the amount of luminescence by multiplying brightness information which is Y in the tristimulus values by the luminous efficiency η. The color information is determined by each ratio of the tristimulus values X, Y and Z.

For example, the calculating section 11 calculates luminescence weighted color information Kφ using the following equation (3).

[Expression 3]

$$K\phi = K(X,Y,Z) \times \eta(\Delta T) \quad (3)$$

Subsequently, the calculating section 11 numbers the luminescence weighted color information Kφ and records the numbered luminescence weighted color information Kφn in the recording section 12. Here, n is a natural number, and the calculating section 11 increments n every time the color information is obtained and records the luminescence weighted color information Kφn=K(Xn, Yn, Zn) in the recording section 12 (step S107).

Next, the calculating section 11 judges whether or not the camera 20 is performing exposure according to the luminescence instruction (step S108). When it is judged that the camera 20 is performing exposure (step S108: Yes), the processing returns to the processing in step S103, and the voltage detecting section 13 obtains a forward voltage Vf.

Meanwhile, when it is judged that the camera 20 is not performing exposure, that is, the exposure is finished (step S108: No), the calculating section 11 calculates final color information Ke using the color information obtained last during the exposure as (Xr, Yr, Zr) (step S109). The calculating section 11 then finishes the LED luminescence processing.

In the processing in step S109, the calculating section 11 integrates a plurality of pieces of color information Kφn obtained during the exposure to determine the final color information (also referred to as color temperature information) Ke (Xe, Ye, Ze) to be used in image processing (color balance processing) in the camera 20.

Here, the calculating section 11 performs integration using the following equation (4) by dividing the color information into tristimulus values (Xe, Ye, Ze) when obtaining the final color information Ke.

[Expression 4]

$$Xe = X1 + X2 + X3 + \ldots Xr$$

$$Ye = Y1 + Y2 + Y3 + \ldots Yr$$

$$Ze = Z1 + Z2 + Z3 + \ldots Zr \quad (4)$$

While in the above-described example, the final color information Ke is expressed with the tristimulus values, the color information may be converted into other color information such as chromaticity and color temperature.

As described above, in the LED, because there is individual variation (individual difference) in the forward voltage Vf and the color information K, in order to obtain the final color information Ke, it is necessary to record in advance a forward voltage Vf and color information K which is used as a reference as reference forward voltage Vfs and reference color information Ks.

Figure 4:
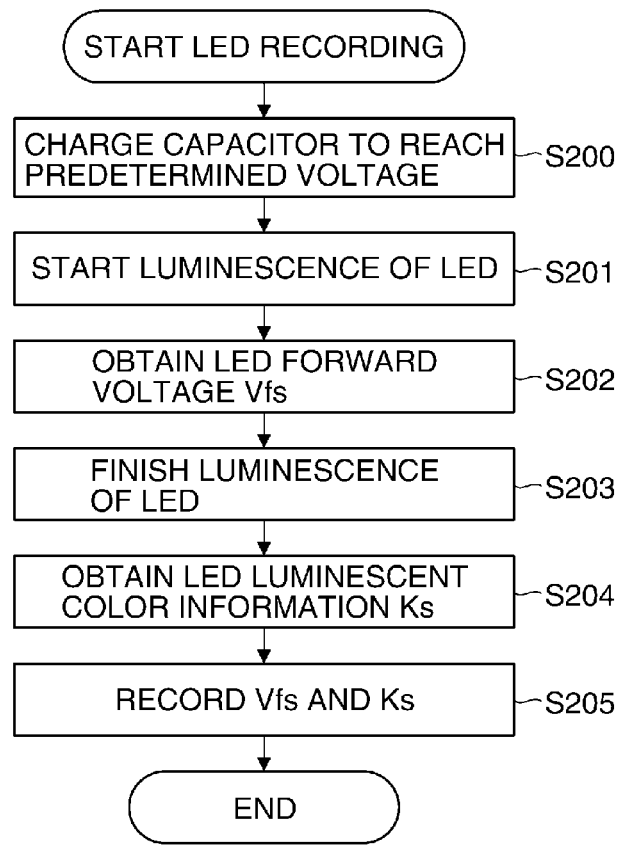
FIG. 4 is a flowchart for explaining processing of recording a reference forward voltage and reference color information in the strobe shown in FIG. 1.

FIG. 4 is a flowchart for explaining processing of recording the reference forward voltage Vfs and the reference color information Ks (LED recording) performed in the strobe shown in FIG. 1. It should be noted that the processing according to the shown flowchart is performed under control of the microcomputer 1.

When the LED recording processing is started, the calculating section 11 controls the charging circuit 5 to start charging of the capacitor 4 using the power supply 3 and charges the capacitor 4 to reach a predetermined voltage (step S200). Next, when a luminescence instruction is received from the camera 20, the luminescence current determining section 14 determines a current value (luminescence current) to be flowed to the LED 6, and makes the LED 6 emit light by controlling the power supply control section 2 to step down the voltage of the capacitor 4 (step S201).

At the same time as start of the luminescence of the LED 6, the voltage detecting section 13 detects a forward voltage Vf of the LED 6 as forward voltage information which is status information on a status change of the light source using the voltage detection resistor 7. The voltage detecting section 13 then sets the detected forward voltage Vf as a reference forward voltage Vfs (step S202).

Because the reference forward voltage Vfs is detected under the predefined conditions, that is, the LED 6 is made to emit light under the predefined conditions, it is possible to recognize relationship between the device temperature and the reference forward voltage Vfs, so that it is possible to obtain the device temperature accurately even if the forward voltage Vf fluctuates.

After the reference forward voltage Vfs is obtained, the luminescence current determining section 14 controls the power supply control section 2 to finish luminescence of the LED 6 (step S203).

During the processing from step S201 to S203, the light emitted from the LED 6 is received at the spectrometer 30, and the spectrometer 30 generates color information according to the emitted light. Here, the color information which is output from the spectrometer 30 is set as reference color information Ks (step S204).

By this means, color information unique to the LED 6 can be obtained as the reference color information Ks. By using this reference color information Ks as a reference, it is possible to determine final color information Ke accurately even when the device temperature fluctuates.

The calculating section 11 records the reference forward voltage Vfs and the reference color information Ks obtained in step S202 and S204 in the recording section 12 (step S205) and finishes the LED recording processing.

By this means, in the first embodiment of the present invention, under the predefined conditions, the forward voltage and the color information unique to the LED are obtained in advance as the reference forward voltage and the reference color information, and the final color information during exposure is determined according to the reference forward voltage and the reference color information.

By this means, it is possible to obtain accurate color information including change of color information in a luminescence time period (that is, in an exposure time period), so that it is possible to correct color balance of image data with high accuracy.

Subsequently, an example of a strobe according to a second embodiment of the present invention will be described. It should be noted that because the configuration of the strobe according to the second embodiment is the same as that of the strobe shown in FIG. 1, the explanation thereof will be omitted here.

In the strobe according to the second embodiment, color information of the LED which changes according to the device temperature is determined using predetermined luminescence conditions such as a drive current and illumination time as drive current information and continued luminescence time period information on the light source which is status information on a status change of the light source. By this means, if the luminescence conditions are determined, it is possible to obtain color information without waiting for end of the luminescence. As a result, in the camera 20, it is possible to perform development processing such as color balance processing at high speed.

Figure 5:
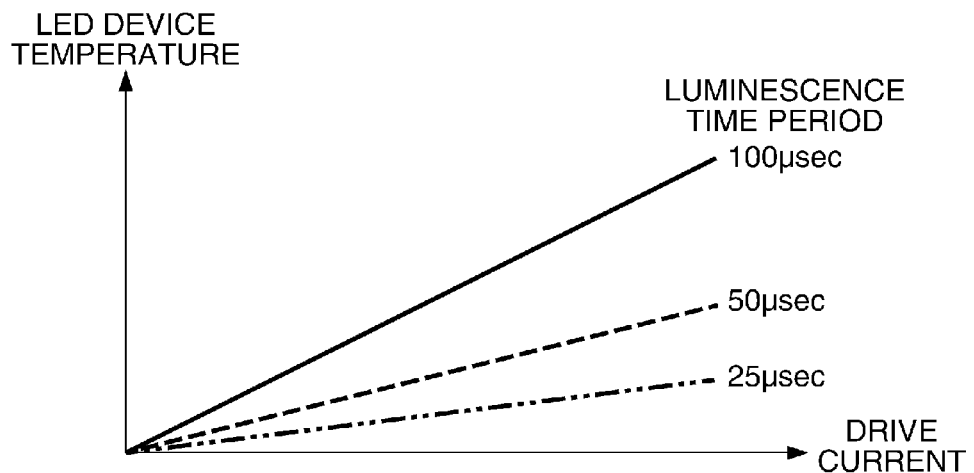
FIG. 5 is a diagram showing relationship between a drive current and illumination time, and a device temperature of an LED used in a strobe according to a second embodiment of the present invention.

FIG. 5 is a diagram showing relationship between the drive current and the illumination time, and the device temperature of the LED used in the strobe according to the second embodiment of the present invention.

In the example shown in FIG. 5, the illumination time of the LED is set at 100 μsec, 50 μsec and 25 μsec, and change of the device temperature of the LED according to the change of the drive current is shown. As shown in FIG. 5, the device temperature linearly increases in accordance with increase of the drive current regardless of difference in the illumination time, and the device temperature becomes higher as the drive current becomes larger.

As described above, because there is regularity in relationship between the drive current and the illumination time of the LED, and the device temperature, it is possible to obtain the device temperature from the drive current and the illumination time of the LED.

It should be noted that a heat radiation coefficient, or the like, which changes according to aspects where an LED is implemented, which will be described later, is required to calculate the device temperature. Further, a method for determining final color information from the device temperature of the LED is the same as that in the first embodiment.

Figure 6:
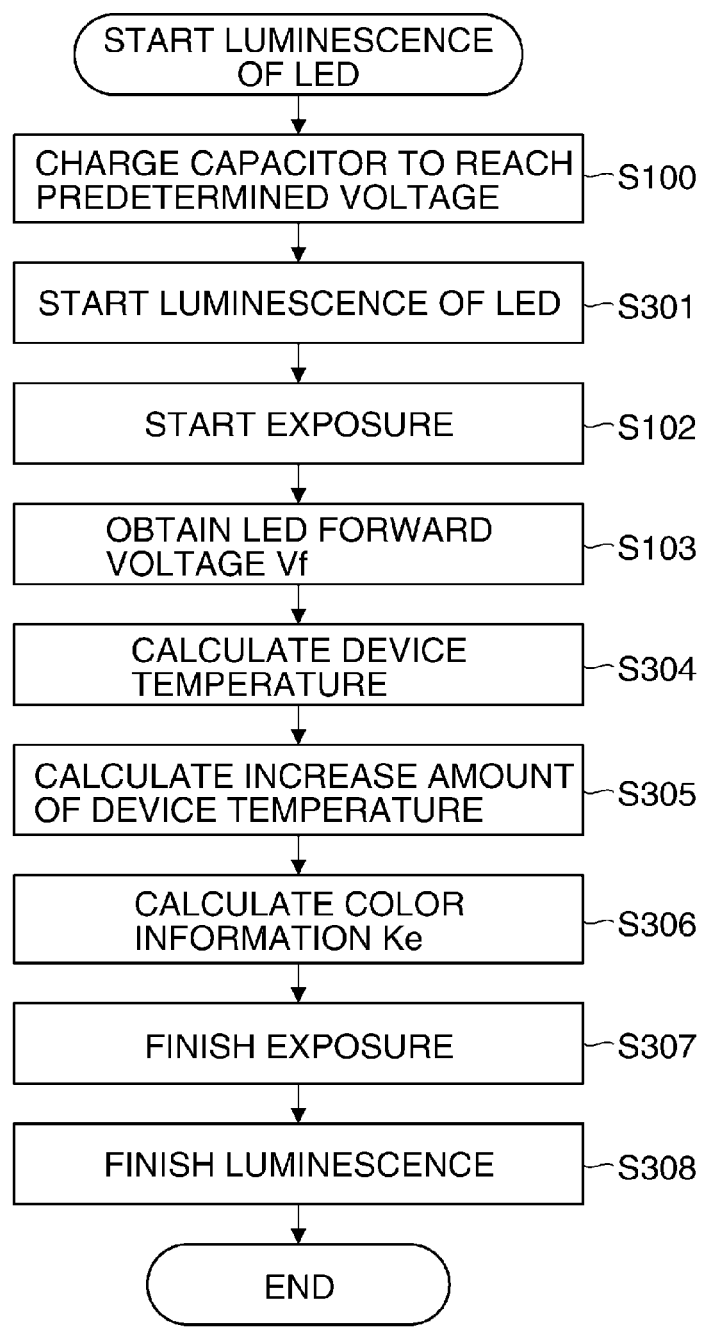
FIG. 6 is a flowchart for explaining processing of detecting color information of an LED in the strobe according to the second embodiment of the present invention.

FIG. 6 is a flowchart for explaining processing of detecting color information of the LED 6 in the strobe according to the second embodiment of the present invention.

It should be noted that the processing according to the shown flowchart is performed under control of the microcomputer 1. Further, in the shown flowchart, the same reference numerals are assigned to steps which are the same as those in the flowchart shown in FIG. 2, and the explanation thereof will be omitted.

After the processing in step S100 described above is performed, when the luminescence conditions are transmitted to the microcomputer 1 from the camera 20, the luminescence current determining section 14 determines an LED drive current and illumination time according to the luminescence conditions. The luminescence current determining section 14 makes the LED 6 emit light by controlling the power supply control section 2 according to the LED drive current and the illumination time to step down the voltage of the capacitor 4 (step S301).

At the same time as start of the luminescence of the LED 6, the camera 20 starts exposure in step S102. The voltage detecting section 13 then detects a forward voltage Vf of the LED 6 at the same time as the start of the exposure in step S103.

The calculating section 11 calculates the device temperature T of the LED 6 according to the detected forward voltage Vf (step S304). Here, a conversion coefficient for converting the forward voltage Vf into the device temperature T of the LED 6 is set as α1. The conversion coefficient α1 is set as a fixed value here because it is determined according to the configuration of a white LED, and, thus, there is small individual variation (individual difference) in the conversion coefficient α1.

For example, the calculating section 11 calculates the device temperature T of the LED 6 using the following equation (5)

[Expression 5]

$$T = Vf \times \alpha 1 \quad (5)$$

As explained in FIG. 5, because there is regularity in the relationship between the LED drive current and the illumination time, and the device temperature, the calculating section 11 calculates an increase amount ΔT of the device temperature per unit time according to the LED drive current and the illumination time.

To obtain the increase amount ΔT, a heat generation coefficient and a heat radiation coefficient of the LED 6 are required. The heat generation coefficient is determined according to luminous efficiency and change of the device temperature unique to the LED 6. Further, the heat radiation coefficient is determined from a heat radiation configuration, implementation, or the like of the LED 6.

Here, given that the LED drive current is I, the illumination time is s, the heat generation coefficient is h, and the heat radiation coefficient is c, the calculating section 11 obtains the increase amount ΔT of the device temperature using the following equation (6) (step S305).

[Expression 6]

$$\Delta T = \frac{I \times s \times h}{c} \quad (6)$$

Subsequently, the calculating section 11 calculates color information (final color information) Ke during the exposure according to the increase amount ΔT of the device temperature (step S306).

Figure 7:
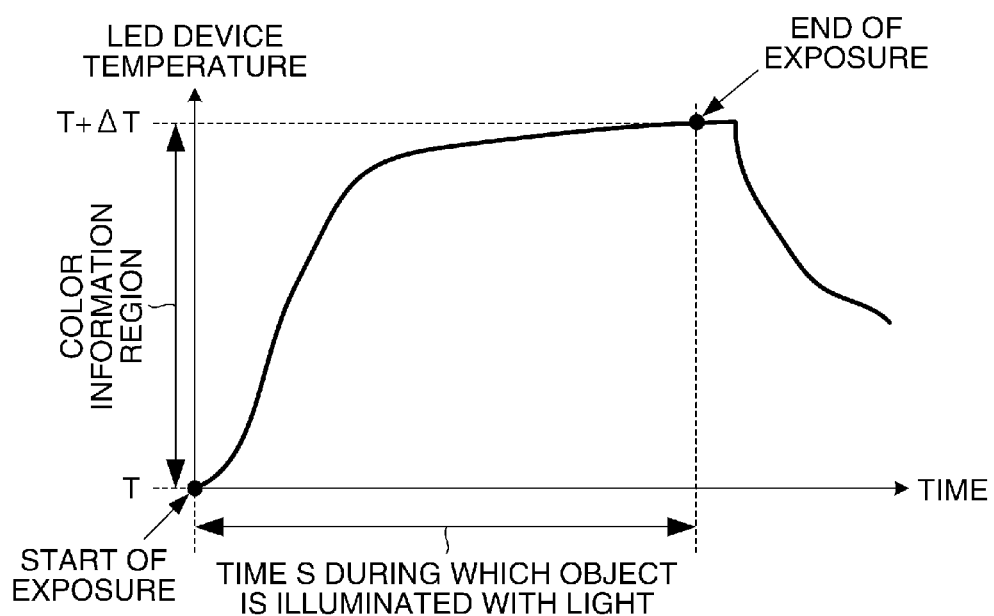
FIG. 7 is a diagram for explaining calculation of color information during exposure performed in the strobe according to the second embodiment of the present invention.
Figure 8:
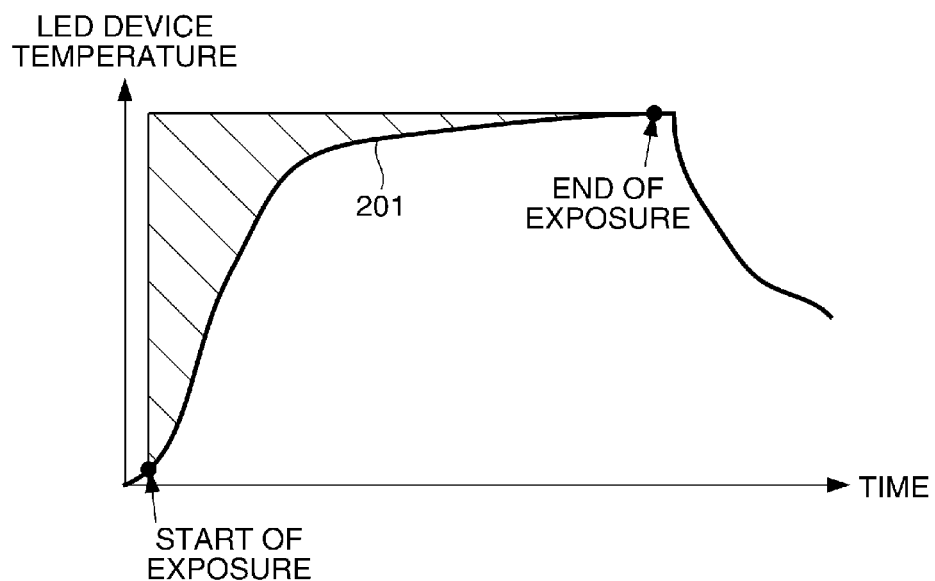
FIG. 8 is a diagram for explaining change of color information in a conventional strobe using an LED.

FIG. 7 is a diagram for explaining calculation of the color information during the exposure performed in the strobe according to the second embodiment of the present invention.

In FIG. 7, the color information Ke to be obtained by the calculating section 11 is color information from start of exposure which is the start of luminescence of the LED light until end of the exposure, and the device temperature of the LED 6 is a device temperature from the start of the exposure until the end of the exposure. To obtain the color information which changes during luminescence, including the information corresponding to temporal change, a temporal change coefficient which indicates temporal change of increase of the temperature is required.

Here, the temporal change coefficient is set as γ. It should be noted that the conversion coefficient β which is a coefficient for converting the device temperature into color information is the same as that in the first embodiment. The calculating section 11 obtains the final color information Ke using the following equation (7) (step S306).

[Expression 7]

$$Ke = \int_{\Delta T}^{T} \beta \times \gamma(t) dt \quad (7)$$

When the final color information Ke is obtained, the camera 20 finishes the exposure (step S307). Then, the calculating section 11 finishes the luminescence of the LED 6 (step S308), and the LED luminescence processing is finished.

While, here, the calculating section 11 obtains the final color information Ke as described above, it is also possible to adopt a configuration where the calculating section 11 includes a color information table indicating relationship between the device temperature and the illumination time, and the color information and retrieves the color information from the color information table according to the device temperature obtained as described above.

As described above, in the second embodiment of the present invention, because the final color information is obtained using the predetermined luminescence conditions such as a drive current and illumination time, it is possible to determine the final color information without waiting for end of the luminescence. By this means, it is possible to obtain accurate color information including change of color information in a luminescence time period (that is, an exposure time period), so that it is possible to correct color balance of image data with high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-082894, filed Apr. 14, 2014, which is hereby incorporated by reference herein in its entirety.

What is claimed is:

1. A light emitting apparatus comprising:
   a light source;
   an information obtaining unit configured to obtain status information on a status change of said light source in a luminescence time period of said light source;
   a determination unit configured to determine color information on a light emitted from said light source in the luminescence time period based on the status information obtained by said information obtaining unit; and
   a storage unit configured to store a temperature change property of the color information on said light source,
   wherein said determination unit calculates temperature information on said light source in the luminescence time period based on the status information obtained by said information obtaining unit, and determines the color information based on the calculated temperature information and the temperature change property of the color information stored in said storage unit.

2. The light emitting apparatus according to claim 1, wherein said storage unit stores a temperature change property of an amount of luminescence of said light source, and
   wherein said determination unit determines the color information based on the temperature change property of the amount of luminescence stored in said storage unit.

3. The light emitting apparatus according to claim 2, wherein said determination unit calculates a plurality of pieces of color information based on the temperature information and the temperature change property of the color information stored in said storage unit, and determines the color information by performing weighting on the calculated plurality of pieces of color information based on the temperature change property of the amount of luminescence stored in said storage unit.

4. A light emitting apparatus comprising:
   a light source;
   an information obtaining unit configured to obtain status information on a status change of said light source in a luminescence time period of said light source;
   a determination unit configured to determine color information on a light emitted from said light source in the luminescence time period based on the status information obtained by said information obtaining unit; and
   a receiving unit configured to receive information on an exposure time period of an image pickup apparatus which is connected to the light emitting apparatus,
   wherein said information obtaining unit obtains the status information for a plurality of times in a time period which overlaps with the exposure time period of the image pickup apparatus within the luminescence time period of said light source.

5. The light emitting apparatus according to claim 1, further comprising an output unit configured to output the color information to an external device.

6. The light emitting apparatus according to claim 1, wherein said information obtaining unit obtains temperature information on said light source as the status information.

7. The light emitting apparatus according to claim 1, wherein said information obtaining unit obtains drive current information and continued luminescence time period information on said light source as the status information.

8. The light emitting apparatus according to claim 1, wherein said information obtaining unit obtains a forward voltage of said light source as the status information.

9. The light emitting apparatus according to claim 1, wherein said light source is an LED.

10. An image pickup apparatus which is connected to a light emitting apparatus, wherein the light emitting apparatus has a light source, an information obtaining unit configured to obtain status information on a status change of said light source in a luminescence time period of said light source, and a determination unit configured to determine color information on a light emitted from the light source in the luminescence time period based on the status information obtained by said information obtaining unit, the image pickup apparatus comprising:

an image pickup unit configured to obtain image data; and an instruction unit configured to instruct, to the light emitting apparatus, supply of a drive current and a notification of the luminescence time period with respect to the light source.

11. A method for controlling an image pickup apparatus which is connected to a light emitting apparatus, wherein the light emitting apparatus has a light source, an information obtaining unit configured to obtain status information on a status change of said light source in a luminescence time period of said light source, and a determination unit configured to determine color information on a light emitted from said light source in the luminescence time period based on the status information obtained by said information obtaining unit, the method comprising:

an image pickup step of obtaining image data; and an instruction step of instructing, to the light emitting apparatus, supply of a drive current and a notification of the luminescence time period with respect to the light source.

12. The light emitting apparatus according to claim 4, further comprising an output unit configured to output the color information to an external device.

13. The light emitting apparatus according to claim 4, wherein said information obtaining unit obtains temperature information on said light source as the status information.

14. The light emitting apparatus according to claim 4, wherein said information obtaining unit obtains drive current information and continued luminescence time period information on said light source as the status information.

15. The light emitting apparatus according to claim 4, wherein said information obtaining unit obtains a forward voltage of said light source as the status information.

16. The light emitting apparatus according to claim 4, wherein said light source is an LED.

* * * * *